United States Patent [19]

Meissner

[11] Patent Number: 5,435,831
[45] Date of Patent: Jul. 25, 1995

[54] CIRCULATING FLUIDIZABLE BED CO-PROCESSING OF FINES IN A DIRECT REDUCTION SYSTEM

[75] Inventor: David C. Meissner, Charlotte, N.C.

[73] Assignee: Midrex International B.V. Rotterdam, Zurich Branch, Zurich, Switzerland

[21] Appl. No.: 289,707

[22] Filed: Aug. 12, 1994

[51] Int. Cl.⁶ ............................................. C21B 13/02
[52] U.S. Cl. ........................................ 75/444; 75/747; 75/751
[58] Field of Search .......................... 75/744, 747, 751

[56] References Cited

U.S. PATENT DOCUMENTS

| Re. 32,247 | 8/1986 | Stephens, Jr. | 75/11 |
| 3,428,446 | 2/1969 | Locke | 75/451 |
| 4,134,907 | 1/1979 | Stephens, Jr. | 260/449.6 M |
| 4,257,781 | 3/1981 | Stephens, Jr. | 48/197 R |
| 4,260,412 | 4/1981 | Summers | 75/35 |
| 4,358,310 | 11/1982 | Sanzenbacher | 75/25 |
| 5,073,194 | 12/1991 | Stephens | 75/376 |
| 5,118,479 | 6/1992 | Stephens, Jr. | 423/148 |
| 5,137,566 | 8/1992 | Stephens, Jr. | 75/507 |

FOREIGN PATENT DOCUMENTS

WO92/02824  2/1992  WIPO .......................... G01N 35/00

*Primary Examiner*—Peter D. Rosenberg
*Attorney, Agent, or Firm*—Ralph H. Dougherty; Scott E. Hanf

[57] ABSTRACT

A method of producing direct reduced iron from pellets, lumps and fines of iron oxide. A mixture of iron oxide raw material is introduced to an apparatus which separates the lumps and pellets from the fines. The lumps and pellets are then introduced to a shaft furnace for direct reduction to iron. Fines are conveyed to a series of circulating fluidizable beds which allows intimate contact with reducing gas to facilitate the direct reduction of the iron oxide fines to metallized iron.

6 Claims, 2 Drawing Sheets

CIRCULATING FLUIDIZABLE BED CO-PROCESSING OF FINES IN A DIRECT REDUCTION SYSTEM

FIELD OF THE INVENTION

The present invention relates to a method and apparatus for direct reduction by a circulating fluidizable bed system which enables the user to simultaneously process fines with lumps and pellets.

BACKGROUND OF THE INVENTION

Direct reduction of iron from iron oxide pellets, lump ore, or other iron oxide containing feed material is usually performed in of a direct reduction furnace, such as a vertical shaft furnace. The feed material usually contains a significant proportion of finely divided material, or "fines", often created by abrasion of the pellets or lumps during handling. These fines are usually screened out prior to reduction. Direct reduction is carried out by contacting the feed material with hot reducing gases rich in carbon monoxide and hydrogen. The reducing gas is passed through a metal oxide containing burden in the furnace and withdrawn from the top of the furnace, along with metal oxide material in the form of finely divided particles, usually generated by abrasion in the furnace. The fines must then be separated from the gas. Heretofore all fines must have been disposed of, which has usually been done by placing the fines into stock piles or attempting to mix the fines with some binder to form a usable material.

The present invention treats these removed fines by reducing them and returning them to the direct reduction system as reduced metallized iron. This greatly enhances the economics of the direct reduction process, and dramatically reduces the amount of waste fines for disposal.

DESCRIPTION OF THE PRIOR ART

Applicant is aware of the following U.S. Patents concerning circulating fluidizable beds and the processing of fines.

| U.S. Pat. No. | Inventor | Issue Date | Title |
| --- | --- | --- | --- |
| 4,134,907 | Stephens, Jr. | 01-16-79 | PROCESS FOR ENHANCING THE FUEL VALUE OF LOW BTU GAS |
| 4,257,781 | Stephens, Jr. | 03-24-81 | PROCESS FOR ENHANCING THE FUEL VALUE OF LOW BTU GAS |
| 4,260,412 | Summers et al. | 04-07-81 | METHOD OF PRODUCING DIRECT REDUCTION IRON WITH FLUID BED COAL GASIFICATION |
| 4,358,310 | Sanzenbacher et al. | 11-09-82 | DRY COLLECTION OF METALLIZED FINES |
| 5,073,194 | Stephens et al. | 12-17-91 | PROCESS FOR CONTROLLING THE PRODUCT QUALITY IN THE CONVERSION OF REACTOR FEED INTO IRON CARBIDE |
| 5,118,479 | Stephens, Jr. | 06-02-92 | PROCESS FOR USING FLUIDIZED BED REACTOR |
| 5,137,566 | Stephens, Jr. et al. | 08-11-92 | PROCESS FOR PREHEATING IRON-CONTAINING REACTOR FEED PRIOR TO BEING TREATED IN A FLUIDIZED BED REACTOR |
| Re. 32,247 | Stephens, Jr. | 09-16-86 | PROCESS FOR THE DIRECT PRODUCTION OF STEEL |
| WO 92/02824 | Hager, et al. | 02-20-92 | METHOD FOR CONTROLLING THE CONVERSION OF IRON CONTAINING REACTOR FEED INTO IRON CARBIDE |

Stephens, Jr., U.S. Pat. No. 4,134,907, teaches a process for increasing the fuel value of a gas mixture of carbon monoxide and hydrogen by converting part of the hydrogen and part of the carbon in the carbon monoxide of the gas mixture to methane, which comprises continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Stephens, Jr., U.S. Pat. No. 4,257,781, discloses a process which uses coal resources economically by converting part of the hydrogen and part of the carbon in the carbon monoxide of the gas mixture to methane, thereafter continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Summers, U.S. Pat. No. 4,260,4412, teaches a method of producing direct reduced iron with fluid bed coal gasification in which a portion of cooled, recycled gas is used as coolant in the gasification chamber and a second portion of the cleaned recycled gas is heated and mixed with the hot, dust-free gasification gas to form reducing gas for the direct reduction process. Limestone is preferably mixed with the pulverized coal feed to the gasification chamber to desulfurize the gas.

Sanzenbacher, U.S. Pat. No. 4,358,310, teaches a method and apparatus for the dry collection of metallized fines from a direct reduction furnace cooling zone in which cooling gas removed from the cooling zone passes through a dust collector and the removed dust is cooled in a fluidized bed, the fluidizing gas being recirculated through an indirect cooler. The process is continuous and the fines are collected at a sufficiently low temperature for easy handling. The apparatus includes a hot gas cyclone in the cooling gas withdrawal line connected to a fluidized bed cooler, a conduit for with-drawing fluidizing gas from the fluidized bed cooler passes through a second cyclone dust collector then through an indirect cooler and returns to the fluidized bed cooler. Cool fines are withdrawn from the fluidized bed cooler into a collector.

Stephens et al., U.S. Pat. No. 5,073,194, teaches a method of controlling product quality in a conversion of reactor feed to an iron carbide-containing product in a fluidized bed reactor. A Mossbauer analysis is performed on product samples leaving the fluidized bed reactor, and a regression analysis is performed on the Mossbauer data. Depending upon the results of the regression analysis, process parameters are adjusted in order to obtain a product having a desired composition. Adjustments are made to the temperature and pressure in the fluidized bed reactor, rate of feed to the fluidized bed reactor, and the composition of the process gas which reacts with the reactor feed in the fluidized bed reactor, dependent upon the analysis results.

Stephens, Jr., et al. U.S. Pat. No. 5,118,479, teaches a process in which the fluidized bed reactor includes a baffle system to ensure the proper residence time of the feed materials. The fluidized bed reactor also provides a novel method for reducing the negative effects of thermal expansion in the reactor.

Stephens, Jr., et al. U.S. Pat. No. 5,137,566, teaches a process for the conversion of reactor feed to iron carbide. The process includes the step of preheating the reactor feed in an oxidizing atmosphere. The iron carbide produced by the process is particularly useful in the production of steel.

Stephens, Jr., U.S. Pat. Re. No. 32,247, teaches a process for the direct production of steel from particulate iron oxides or concentrates including two major steps in which in Step (1) the iron oxides are converted to iron carbide and in Step (2) steel is produced directly from the carbide in the basic oxygen furnace or the electric furnace. In the production of the carbide the oxides are reduced and carburized in a single operation using a mixture of hydrogen as a reducing agent and carbon bearing substances such as propane primarily as carburizing agents. Iron carbide thus produced is introduced as all or part of the charge into a basic oxygen furnace to produce steel directly without the blast furnace step. In order to make the steel making process auto-thermal, heat is supplied either by using the hot iron carbide from Step (1) or preheating the iron carbide or by including sufficient fuel in the iron carbide to supply the required heat by combustion.

Hager et al., European Patent WO 92/02824 teaches a process for controlling the conversion of reactor feed to iron carbide. The reactor feed is subjected to a process gas in a fluidized bed reactor (10), and measurements (56) are taken of individual gases in the off-gas from this reaction and the temperature (64) and pressure (66). A stability phase diagram is generated based on the temperature. Different regions of the stability phase diagram are representative of different products being formed by the conversion of the reactor feed. Based on concentrations of the individual gases in the off-gas and the total pressure, a point is plotted on the stability phase diagram indicative of the favored reaction product. The process parameters can then be adjusted to insure that iron carbide can be produced from the reactor feed based on the stability phase diagram.

SUMMARY OF THE INVENTION

This invention is a method and apparatus for producing direct reduced iron from a mixture of pellets, lumps and fines by adding apparatus to effectively process the fines. The lumps and pellets are processed in a shaft reduction furnace as taught in Beggs U.S. Pat. No. 4,046,557. The invention encompasses a new method and apparatus for the direct reduction of oxide fines. Pellets, lumps and fines are all brought together and placed in an apparatus configured to separate the fines from the pellets and lumps. The pellets and lumps of iron oxide are then transported to a shaft reduction furnace where they undergo the direct reduction process. The fines are transported to a series of circulating fluidized beds and a portion of the reduction gas from the reformer is also delivered to the series of circulating fluidizing beds.

The reducing gas from the reformer enters the circulating fluidized bed containing the most reduced fines. The reducing gas is passed upward through a bed of solid iron oxide fine particles with sufficient velocity for the particles to separate from one another and become freely supported in a fluid like state. At this point the total fluid frictional force of the particles is equal to or greater than the effective weight of the bed. This allows intimate contact between solid and gas, with high rates of heat transfer and uniform temperatures within the bed. This facilitates the reduction of iron oxide into metallized iron, water and carbon dioxide, the two latter components being removed from the bed.

OBJECTS OF THE INVENTION

The principal object of the invention is to provide an improved method of processing pellets lumps and fines in one facility.

A further object of this invention is to provide a method of reducing iron oxide fines directly to iron without blowing the vast majority of the fines out the shaft reduction furnace.

Another object of the invention is to provide apparatus for the simultaneous processing of fines with pellets and lumps at one facility so that reformers and scrubbers are shared by both the shaft reduction furnace and the series of circulating fluidizable beds.

BRIEF DESCRIPTION OF THE DRAWINGS

The foregoing and other objects will become more readily apparent by referring to the following detailed description and the appended drawings in which.

DETAILED DESCRIPTION

Figure 1:
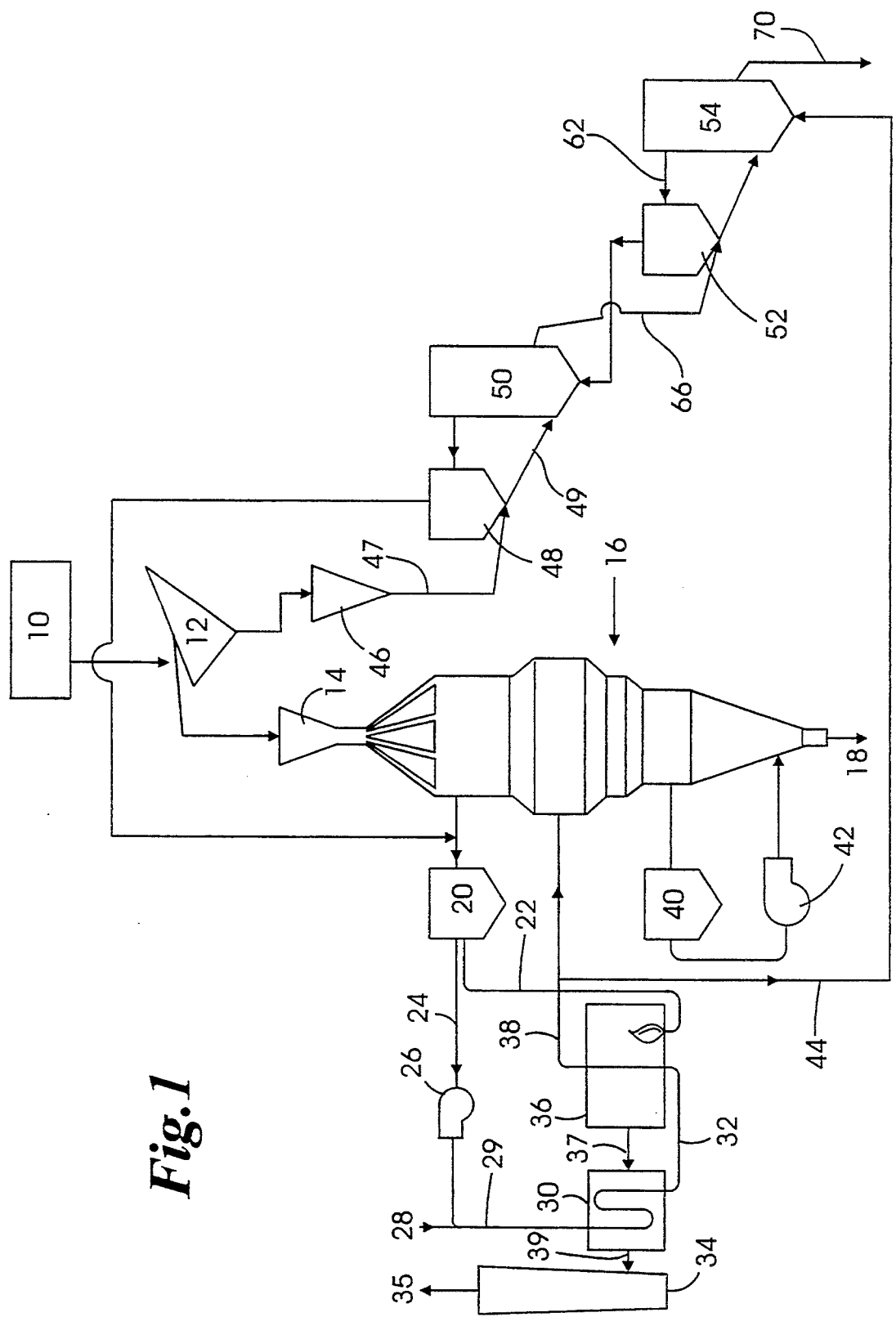
FIG. 1 is a schematic diagram of the invented process for direct reduction of iron oxide pellets, lumps and fines.

Referring now to FIG. 1, iron oxide feed 10 consisting of a mixture of pellets, lumps, and fines, is introduced into a separator apparatus 12, which can be simply a screen which allows the fine particles to pass through the openings in the screen whereas the lumps and pellets remain on the top of the screen 12 and can be removed to shaft furnace feed hopper 14 for processing in shaft furnace 16. Top gas from the shaft furnace 16 is removed and passes through top gas scrubber 20 which removes impurities and particulates, and the cleaned, scrubbed top gas is then removed through pipes 22 and 24. The top gas from pipe 22 is fed into the burner of reformer 36 as fuel. The top gas from pipe 24 is then passed through a process gas compressor 26, after which it is mixed with mixed with natural gas 28 in pipe 29. The mixture of the processed top gas and natural gas is sent through heat recovery unit 30 and then through pipe 32 into the reformer 36. The mixture of the processed top gas and natural gas is reformed to produce the reducing gas which is introduced through pipe 38 into the shaft furnace 16 so that the direct reduction process can take place. The shaft furnace 16 is also configured with a cooling gas scrubber 40 and a cooling gas compressor 42 which recirculates the cleaned cooling gas to the cooling zone. The exhaust products from the reformer 36 are sent to the heat recovery unit 30 through a pipe 37 and exit the heat recovery unit 30 via pipe 39 to the exhaust stack 34 from which the flue gas 35 exits the system.

Because of the size and weight of the iron oxide fines, they cannot be introduced into the shaft furnace. Basically, fines are too light and are blown out of the furnace 16 with the top gas and exit the system. Therefore, a separate process is needed to allow effective processing of the fines. In the invented process, the fines enter with the pellets and lumps 10 into the separation unit 12, and are removed and collected into hopper 46. Then the fines pass through pipe 47, where they are joined by more iron oxide fines from cyclone 48, and are moved through pipe 49 into the circulating fluidizable bed 50.

Some of the reducing gas 38 is diverted from the shaft furnace through piping 44 into the final circulating fluidizable bed 54. This gas exits the circulating fluidizable bed 54 through pipe 62 into the cyclone 52. Cyclone 52 throws the heavy particles such as the iron oxide fines to the outside of the unit where their weight pulls them out of the gas stream. Thereafter, the fines fall to the bottom of the cyclone where they are mixed with the fine particles coming from circulating fluidizable bed 50 through pipe 66. Thereafter, the fines enter the final circulating fluidizable bed 54. Finally, the reduced iron fines exit the circulating fluidizable bed 54 through pipe 70 where they can be diverted to the hot briquetting or simply collected for later processing.

Figure 2:
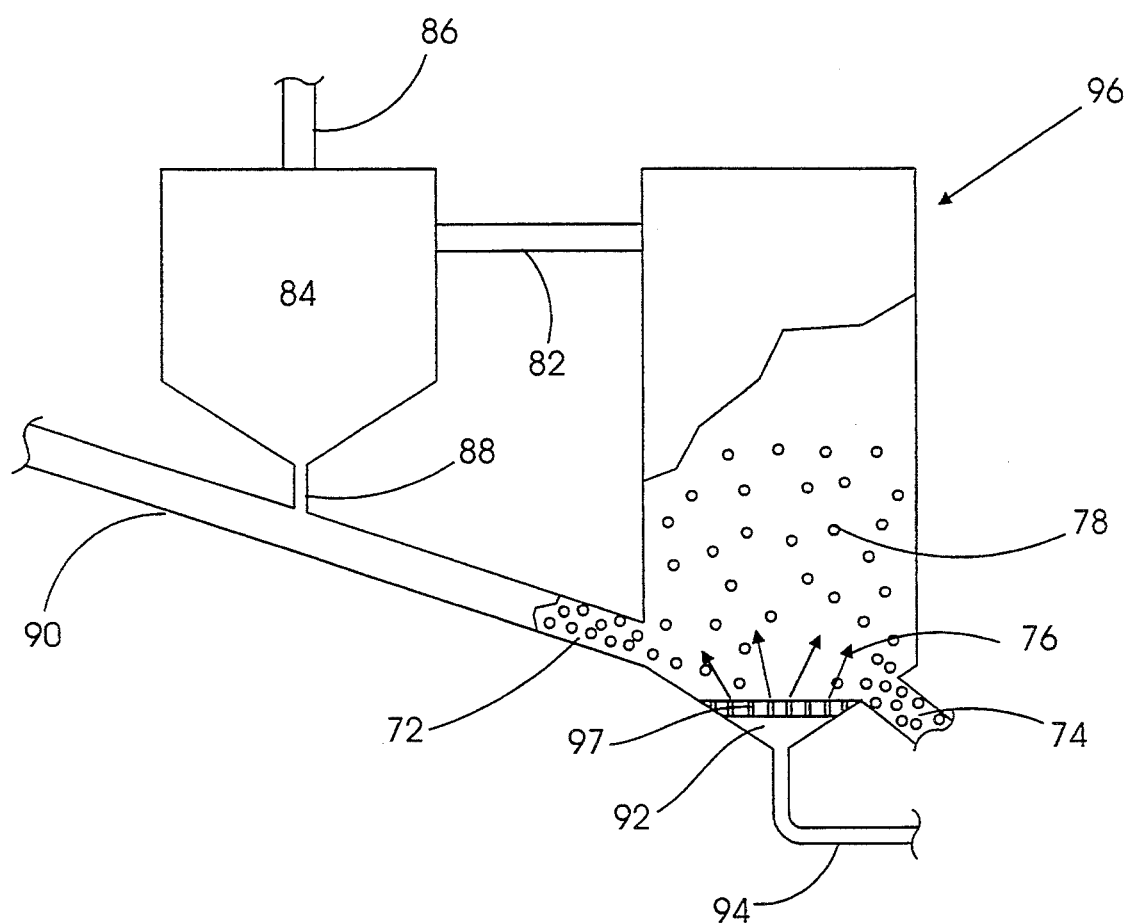
FIG. 2 is an enlarged schematic, partially sectioned view of one of a series of circulating fluidizable beds used in the direct reduction of the iron oxide fines in accordance with the invention.

FIG. 2 shows an enlarged view of the circulating fluidizable bed. Feed pipe 90 contains iron oxide fines 72 coming from cyclone 84 or any preceding circulating fluidizable beds flowing into the circulating fluidizable bed 96. The reducing gas flows through feed pipe 94 into gas dispersion chamber 92 in the bottom of the circulating fluidizable bed 96. The reducing gases pass directly into the CFB or through an orifice-containing plate 97, upward through a bed of solid iron oxide fine particles with a sufficient velocity for the particles to separate from one another and become freely supported in a fluid-like state 78. At this point, the total fluid friction force of the particles is equal to or greater than the effective weight of the bed. This allows intimate contact between the solid and gas with high rates of heat transfer and uniform temperatures within the bed. The top of the bed is undefined. This process works to facilitate the reduction of iron oxide into iron, water (steam), and carbon dioxide. Partially spent reducing gas and iron oxide fine particles leave the circulating fluidizable bed 96 through gas exit pipe 82 and are transferred into cyclone 84. Cyclone 84 spins the reducing gas and iron oxide fine particles in a centrifugal manner causing the iron oxide fines to separate from the reducing gas and fall through particle exit pipe 88, from which they are processed back through pipe 90 into the circulating fluidizable bed 96. The partially spent reducing gas exits the cyclone through pipe 86.

Iron oxide fine particles enter the system through feed pipe 90 either from a previous circulating fluidizable bed or from the separator apparatus 12 shown in FIG. 1. As more particles are added to the fluid-like state 78, a number of the particles will fall out of the suspension to be collected at the bottom of the circulating fluidizable bed 96. These particles are subsequently removed through pipe 74.

ALTERNATIVE EMBODIMENTS

While in FIG. 1 the series of circulating fluidizable beds are shown with two circulating fluidizable beds 50 and 54, it is possible to use as few as one circulating fluidizable bed or as many as six circulating fluidizable beds. The number of circulating fluidizable beds to be used in series will be determined by the amount of time that the fine particles need to be suspended in the fluidizable bed, and the amount of time it will take for the fines to move through the system.

It is also possible to have more than one cyclone associated with a single circulating fluidizable bed. This may be necessary for the last circulating fluidizable bed and cyclone application in the series where it is desirable to avoid introduction of any iron oxide fine particles into the subsequent scrubber.

SUMMARY OF THE ACHIEVEMENT OF THE OBJECTS OF THE INVENTION

From the foregoing, it is readily apparent that I have invented an improved method and apparatus for producing direct reduced iron from a mixture of pellets, lumps and fines by adding apparatus to effectively process the fines.

The invention provides an improved method of processing pellets lumps and fines in one facility. Currently if fines are introduced directly into the shaft reduction furnace the vast majority of the fines would be blown out into the scrubber for separation from the gas stream.

This invention provides simultaneous processing of fines with pellets and lumps at one facility, so that reformers and scrubbers are shared by both the shaft reduction furnace and the series of circulating fluidizable beds. This sharing of key components allows the fines to be processed more efficiently and economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. In a vertical shaft-type reducing furnace having an upper reducing zone, a lower product discharge zone, means for introducing reducing gas intermediate to the ends of the shaft furnace, means for removing metallized product from the bottom thereof, means for removing reacted top gas from the top of the furnace, means for treating removed top gas, means for adding natural gas to processed top gas, and means for producing reducing gas, the improvement comprising:

(a) a source of iron oxide feed consisting essentially of iron oxide in the form of pellets, fines, lumps, and mixtures thereof;
(b) means for separating the iron oxide fines from pellets and lumps, said separating means communicating with said source of iron oxide feed;
(c) means for conveying the pellets and lumps from said separating means to the shaft furnace, said conveying means communicating with said separating means and with said furnace;
(d) fluidizing bed means for fluidizing iron oxide fines with reducing gas and for reducing the iron oxide fines to metallized iron fines;
(e) means for conveying the iron oxide fines from the separating means to the fluidizing bed means;
(f) means for conveying reducing gas from the means for producing reducing gas to the fluidizing bed means; and
(g) means for collecting metallized iron fines from the fluidizing bed means.

2. Apparatus according to claim 1, further comprising:
means for conveying excess reducing gas and iron oxide particles from the fluidizing means to a separating means;
means for separating iron oxide particles from process reducing gas; and
means for conveying separated process reducing gas to the means for treating removed top gas.

3. Apparatus according to claim 1 wherein the means for separating the iron oxide pellets and lumps from the iron oxide fines is a screen.

4. Apparatus according to claim 1 wherein the means for fluidizing iron oxide fines is at least a pair of interconnected circulating fluidized beds.

5. Apparatus according to claim 1 wherein the means for separating the processed reformed gas from iron oxide fines is a cyclone.

6. Apparatus according to claim 4 wherein multiple circulating fluidizable beds are connected in series for processing of iron oxide fines.

* * * * *